March 8, 1955     B. HUTCHINSON     2,703,718
DEVICE FOR RESISTING TILTING OF A VEHICLE WHEN TURNING
Filed Feb. 4, 1954
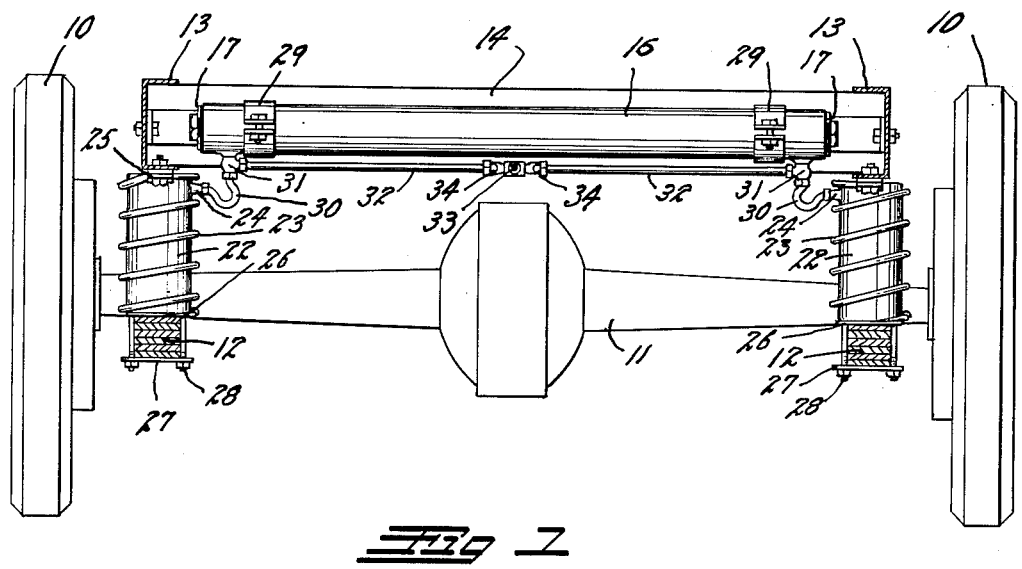
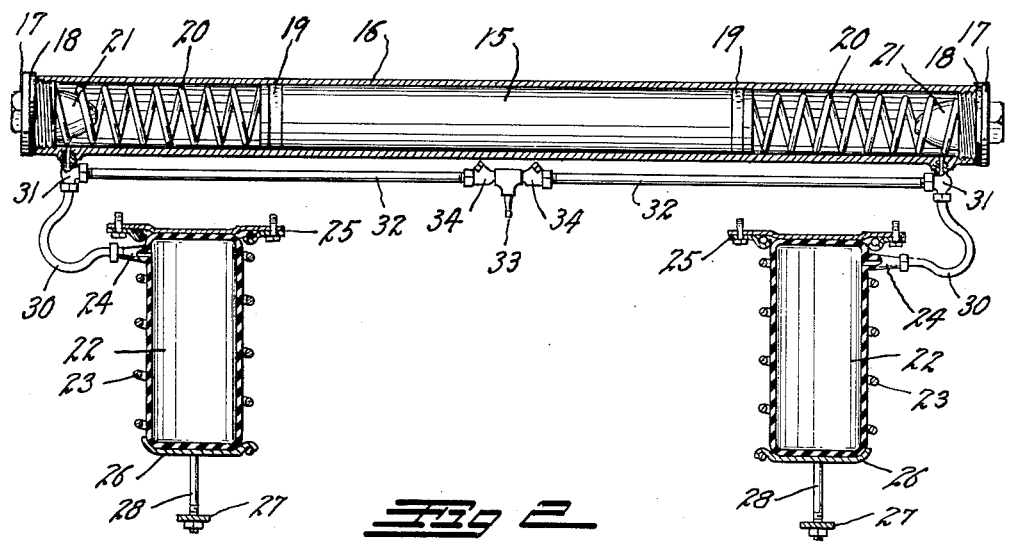
INVENTOR.
BEN HUTCHINSON
BY
ATTORNEY › # United States Patent Office 2,703,718
Patented Mar. 8, 1955

2,703,718
DEVICE FOR RESISTING TILTING OF A VEHICLE WHEN TURNING

Ben Hutchinson, Denver, Colo.

Application February 4, 1954, Serial No. 408,245

2 Claims. (Cl. 280—112)

An automotive vehicle, when turning in an arc from a straight path, tends to tilt outwardly from the axis of the arc due to the action of centrifugal force upon the body of the vehicle. This tendency, or in other words the centrifugal force acting on the body, is, of course, directly proportional to the speed of the vehicle and inversely proportional to the radius of the arc about which the vehicle is traveling.

This invention relates to a device for counteracting this tendency of a vehicle to tilt when rounding a turn and has for its principal object the provision of a device of this character which will utilize centrifugal force generated by the turning vehicle to urge the vehicle body to tilt inwardly toward the axis of the turn in proportion to the amount of centrifugal force generated by the turn so that the normal tendency to tilt outwardly will be counterbalanced by a counteracting urge to tilt inwardly so as to tend to maintain the vehicle in a condition of normal equilibrium at all times.

Another object of the invention is to provide a device for the above purpose which will operate entirely automatically and which will not require any source of power other than the centrifugal force generated by the turning vehicle.

A further object is to so construct the improved tilt resisting device that it can be quickly and easily applied to any conventional vehicle without interfering in any way with the normal operation of the vehicle or its power plant.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a cross sectional view across the rear extremity of a conventional automotive vehicle chassis illustrating the invention in place thereon; and Fig. 2 is a longitudinal section through the assembled elements of the improved tilt counteracting device removed from the vehicle.

The cross sectional view of Fig. 1 is taken immediately rearward of the rear axle housing of the vehicle. In this view, the rear wheels of the vehicle are indicated at 10, the rear axle housing at 11 and the rear vehicle springs at 12. The longitudinal members of a vehicle chassis are illustrated at 13 and a cross chassis member at 14. The above elements are typical of a conventional automotive vehicle.

The invention employs a centrifugally-actuated, weighted cylindrical, floating piston 15 which is snugly and slidably mounted in an elongated cylinder 16 closed at its extremities in any desired manner such as by means of threaded plugs 17 and sealing gaskets 18.

The piston is provided with any suitable devices for sealing it to the wall of the cylinder 16 such as suitable sealing rings as indicated at 19.

The piston 15 is constantly urged to a medial position in the cylinder 16 by means of two similar, oppositely-acting compression springs 20 one of which is compressed between each end of the piston and the adjacent threaded plug 17. A resilient cushion member 21 is positioned within each spring 20 to prevent the piston from striking the threaded plugs 17.

The above described cylinder and piston assembly is employed in combination with two pneumatically-expansible devices of any suitable character. As illustrated, the expansible devices comprise what are known to the trade as "Air Lifts" which are normally used as pneumatic overload springs on vehicles.

The illustrated pneumatically-expansible devices employ an elongated flexible and expansible air tight air bag 22 enclosed in a coarse pitch, helical spring 23. The air bag is hollow and is provided with a filling nipple 24. The upper extremity of each helical spring carries suitable attachment clips 25 and the lower extremity is provided with a spring seat plate 26 from which a clamp bar 27 is suspended by means of suitable clamp bolts 28.

As illustrated in Fig. 1, one of the spring seat plates 26 is clamped to each of the rear springs 12 by means of the clamp bolts 28 and clamping bars 27 so as to vertically support the helical springs 23 and the air bags 22 upon the springs 12. The attachment clips 25 are secured beneath the longitudinal chassis members 13 in any desired manner. The cylinder 16 is fixedly secured transversely of the axis of the vehicle chassis in any desired manner. As illustrated, the cylinder is secured by means of clamping clips 29 to the vehicle cross chassis member 14 between the springs 12.

An air hose 30 is extended from the nipple 24 on each of the air bags 22 to a hose fitting 31. The fittings 31 communicate with the extremities of the elongated cylinder 16 so that the air in each air bag 22 will be in constant communication with the air in the extremity of the cylinder 16 which is adjacent that respective air bag.

It will be seen that if the piston 15 be forced to the right in the cylinder 16, it will act to increase the air pressure in the right-hand air bag 22 to cause the latter to expand and tend to lift the right side of the vehicle. The movement of the piston to the right will, of course, relieve the pressure on the air at its left and in the left-hand air bag 22 to allow the vehicle to tilt to the left.

This pumping action of the piston 15 is utilized in this invention for automatically resisting tilting of the automotive body when making a turn, for it can be seen that if the vehicle is turned sharply to the left of its path, the action of centrifugal force and inertia on the piston 15 will cause it to move to the right relative to its enclosing cylinder 16. This will immediately increase the pressure in the right hand air bag and decrease the pressure in the left hand air bag to exert a bias on the body of the vehicle tending to tilt the body toward the axis of the turn and counteracting the action of centrifugal force upon the body. A turn to the right, of course, will produce an opposite counteracting reaction.

The device will function with normal atmospheric pressure on both sides of the piston 15. It is preferred, however, to place a higher-than-atmospheric air pressure, depending upon the weight of the vehicle usually approximately four pounds p. s. i., on each side of the piston so that the air bags will respond more rapidly to the piston movements.

Compressed air may be applied to the device by means of an air pipe 32 extending between and communicating with the two hose fittings 31. The air pipe 32 is provided with an air filling valve 33, similar to the usual tire valve, adjacent its medial portion through which air may be introduced into both air bags and to both sides of the piston from any suitable filling station hose.

A conventional check valve 34 is positioned in the air pipe 32 at each side of the filling valve 33. These check valves are directed so that they will allow air from the valve 33 to enter into the air bags but will prevent air from flowing therefrom. Therefore, any desired predetermined pressure may be introduced into this automatic tilt-resisting mechanism without affecting the basic function thereof.

While the air expansible devices have been described as expanding air bags of the "Air-Lift" type, they could, of course, be any suitable air expansive device such as cylinders and pistons, telescoping cylinders, diaphragms, etc.

While the improved device for counteracting the tilting tendency of a vehicle has been illustrated and described as mounted on and between the rear springs of a vehicle, it is to be understood that it is not limited to this particular position on the vehicle. The expansible devices could also be mounted adjacent the front springs of the vehicle or adjacent all of the springs of the vehicle if desired, and the transverse cylinder could be mounted at any desired longitudinal position on either the body or the running gear of the vehicle. It is essential, however, that regardless of its position on the vehicle the cylinder 16 must extend transversely of the axis of the vehicle.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A device for resisting the tilting of the body of an automotive vehicle when making a turn comprising: an air expansible device positioned between the running gear of said vehicle and the body thereof at each side of the latter; an elongated cylinder having pneumatically sealed extremities mounted on said vehicle transversely of the axis thereof; a piston freely slidable within said cylinder; means on said piston acting to pneumatically seal the latter to the wall of said cylinder so that alternating longitudinal movements of said piston in said cylinder will alternately compress air in the extremities of said cylinder; an air conduit at each extremity of said cylinder communicating between that extremity and one of said air expansible devices so that the air compressed by the alternate movements of said piston in said cylinder will alternately expand said expansible devices; and means for initially introducing air under pressure into both extremities of said cylinder.

2. A device for resisting the tilting of the body of an automotive vehicle when making a turn comprising: an air expansible device positioned between the running gear of said vehicle and the body thereof at each side of the latter; an elongated cylinder having closed extremities mounted on said vehicle transversely of the axis thereof; a piston freely slidable within said cylinder; an air conduit at each extremity of said cylinder communicating between that extremity and one of said air expansible devices so that alternate movements of said piston in said cylinder will alternately expand said expansible devices; resilient means positioned between said piston and each extremity of said cylinder and acting to urge said piston to a medial position in said cylinder; means for introducing air under pressure into said cylinder at each extremity of said piston; and means for preventing air from by-passing from one extremity of said cylinder to the other.

References Cited in the file of this patent

UNITED STATES PATENTS

| | | |
|---|---|---|
| 2,126,642 | Jones | Aug. 9, 1938 |
| 2,618,492 | Singer | Nov. 18, 1952 |
| 2,684,254 | Goss | July 20, 1954 |